United States Patent
Peterson

(10) Patent No.: US 9,970,585 B2
(45) Date of Patent: May 15, 2018

(54) C FLANGE BRACKET

(71) Applicant: Anthony Peterson, Roanoke, VA (US)

(72) Inventor: Anthony Peterson, Roanoke, VA (US)

( * ) Notice: Subject to any disclaimer, the term of this patent is extended or adjusted under 35 U.S.C. 154(b) by 231 days.

(21) Appl. No.: 15/001,247

(22) Filed: Jan. 20, 2016

(65) Prior Publication Data

US 2017/0205018 A1    Jul. 20, 2017

(51) Int. Cl.
| | | |
|---|---|---|
| *F16L 55/18* | (2006.01) | |
| *F16L 23/00* | (2006.01) | |
| *F16L 23/036* | (2006.01) | |
| *F16L 23/18* | (2006.01) | |

(52) U.S. Cl.
CPC ............. *F16L 55/18* (2013.01); *F16L 23/003* (2013.01); *F16L 23/036* (2013.01); *F16L 23/18* (2013.01)

(58) Field of Classification Search
CPC ......... F16L 23/02; F16L 23/18; F16L 23/032; F16L 23/0286; F16L 55/18; Y10T 403/642; Y10T 403/645; Y10T 403/52

See application file for complete search history.

(56) References Cited

U.S. PATENT DOCUMENTS

| | | | | | |
|---|---|---|---|---|---|
| 693,367 | A * | 2/1902 | Brooke | .................... | F16L 27/04 285/261 |
| 961,987 | A * | 6/1910 | Rust | ...................... | F16L 23/032 285/332 |
| 1,309,146 | A * | 7/1919 | Mann | .................... | F16L 23/032 285/286.2 |
| 3,551,006 | A * | 12/1970 | James | .................... | F16L 23/032 285/16 |
| 3,761,114 | A * | 9/1973 | Blakeley | ................. | F16L 23/02 24/517 |
| 3,895,833 | A * | 7/1975 | Thiessen | ................. | F16L 23/02 285/111 |
| 6,015,170 | A * | 1/2000 | Carpenter | ............... | F16L 23/00 285/223 |
| 6,264,251 | B1 * | 7/2001 | Kunsman | .............. | F16L 23/032 285/405 |
| 6,276,729 | B1 * | 8/2001 | Sanwald | ................. | B01L 3/565 285/368 |
| 7,114,752 | B2 * | 10/2006 | Voelker | .................... | F16L 27/12 285/302 |
| 9,611,960 | B2 * | 4/2017 | Swingley | ............... | F16L 23/003 |
| 2013/0270818 | A1 * | 10/2013 | Chung | .................. | F16L 23/032 285/223 |
| 2017/0130880 | A1 * | 5/2017 | Kempf | .................. | F16L 23/003 |

\* cited by examiner

*Primary Examiner* — Joshua T Kennedy

(57) ABSTRACT

This invention differs in design from other flange brackets in its shape and not limited in use as prescribed. The design of this invention differs from existing flange bracket designs in that it uses at least two bisecting section and a two piece assembly design. The "T" formed shape of the metal pieces offers a strength benefit by providing additional and distributed strength along and against the pipe flange. The application of operable fitted bolts tightened with operable nuts increases the strength of the bracket. The ability of the user to install this flange bracket is easily managed without having to cut the flanged pipes. With other repair systems metal pipes have to be cut; bracket installed then pipes reattached usually by welding the pipe or affixing a compression coupler; or with systems having interlaced flanged pieces do not provide the strength along and against a flanged pipe due to their flat construction.

8 Claims, 5 Drawing Sheets

C FLANGE BRACKET

PROVISIONAL PATENT NUMBER/REFERENCE

This application claims the benefit of priority of U.S. provisional application No. 62/105,788, filed Jan. 21, 2015 the contents of which are herein incorporated by reference.

A metal repair system that uses a two piece flange bracket assembly for pipes with flanges particularly for those that undergo heat and are susceptible to vibration forces. This invention places reinforcement along the mating surfaces of an adjoining flange allowing distributed pressure of a flange surface area against one another and can apply additonal support of a pipes existing seperate piece flat flanges. This bracket assembly is installed without having the user to cut the pipe and can be used with existing flanges that are flat or cupped where it is a seperate piece from a pipe. Each side of this flange bracket assembly has two pieces constructed of bisecting "T" metal pieces welded along its span or molded at length wherein the ends have affixed medal tubes that are, when interlaced during assembly, joined by way of operable fitted threated bolts and tightened using operable threated nuts.

This application, its contents or the scope of this invention is not federally sponsored nor is in part or whole associated with any federal research or development project.

BACKGROUND OF INVENTION

The present invention relates to piping repair parts and accessories that are typically found on combustion engines with exhaust gases piped away from the engine or pressurized systems with piping and more particularly, to a circular shaped two piece bracket system to support weaken flanges joints of adjoining pipes. When gases or pressured liquid medium passes from one pressured piping system to its adjoining pipe whose ends are flanged, variation in pressure and/or heat causes flanges point of contact to weaken. In the case of hot exhaust gases, gaskets installed between these flanges become exposed to hot gases and are susceptible to deterioration resulting from the escaping hot gases outside of the piping system.

Conventional repair systems either have a messed flat two piece assembly system with minimal and varying strength along the entire surface mating area of the bracket or a single piece bracket requiring the user to cut the pipe, insert the pipe into the bracket then weld or join using a coupling the cut pipe onto its original place.

SUMMARY OF THE INVENTION

Figure 1:
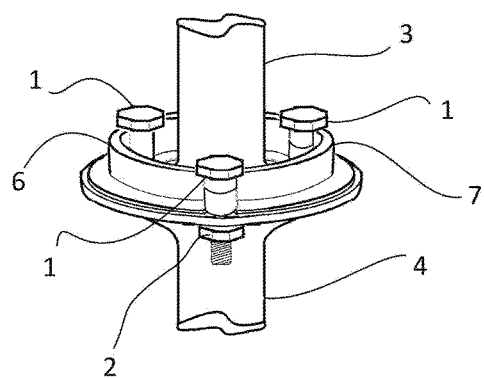
FIG. 1 is a perspective view of a pipe with a flat flange adjoined with a pipe with a flat holed flange repair assembly using a flange repair system according to an exemplary embodiment of the present invention.
Figure 2:
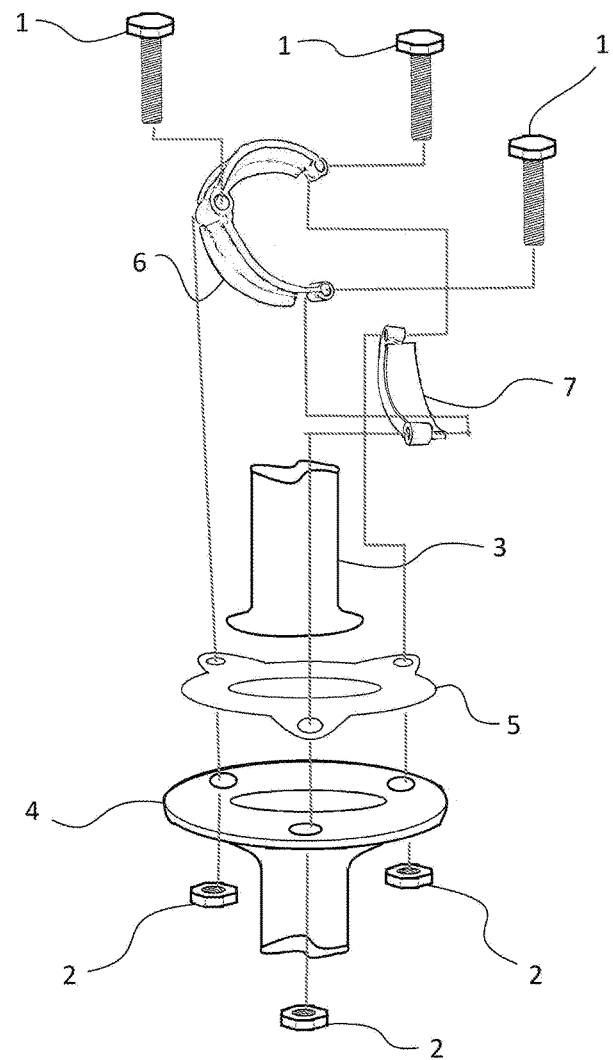
FIG. 2 is an exploded perspective view of a flange repair system for FIG. 1.
Figure 3:
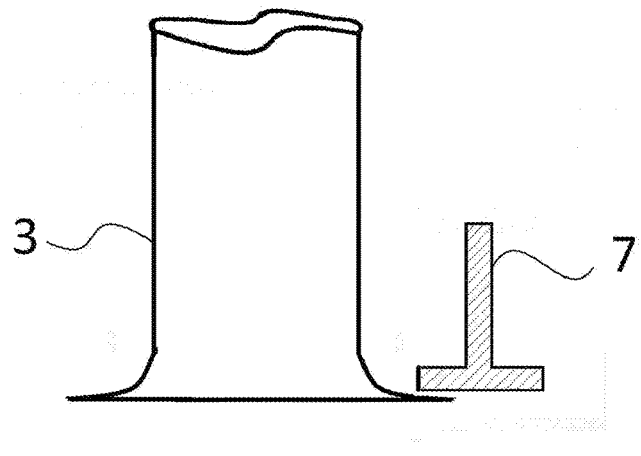
FIG. 3 is a two dimensional sliced cut-away view of a "T" shaped flange bracket and its placement relationship to a flange pipe shown in FIG. 1,2.
Figure 4:
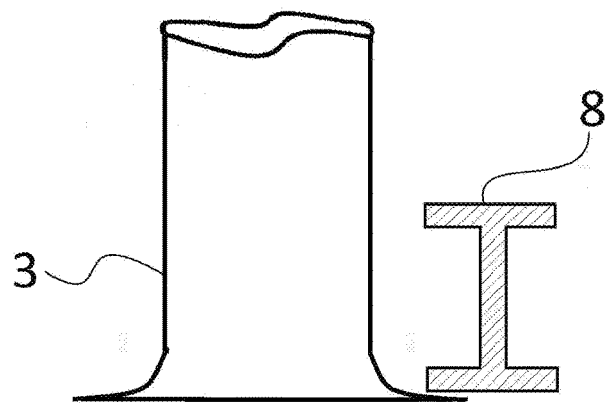
FIG. 4 is a two dimensional sliced cut-away view of a "I" shaped flange bracket and its placement relationship to a flange pipe.
Figure 5:
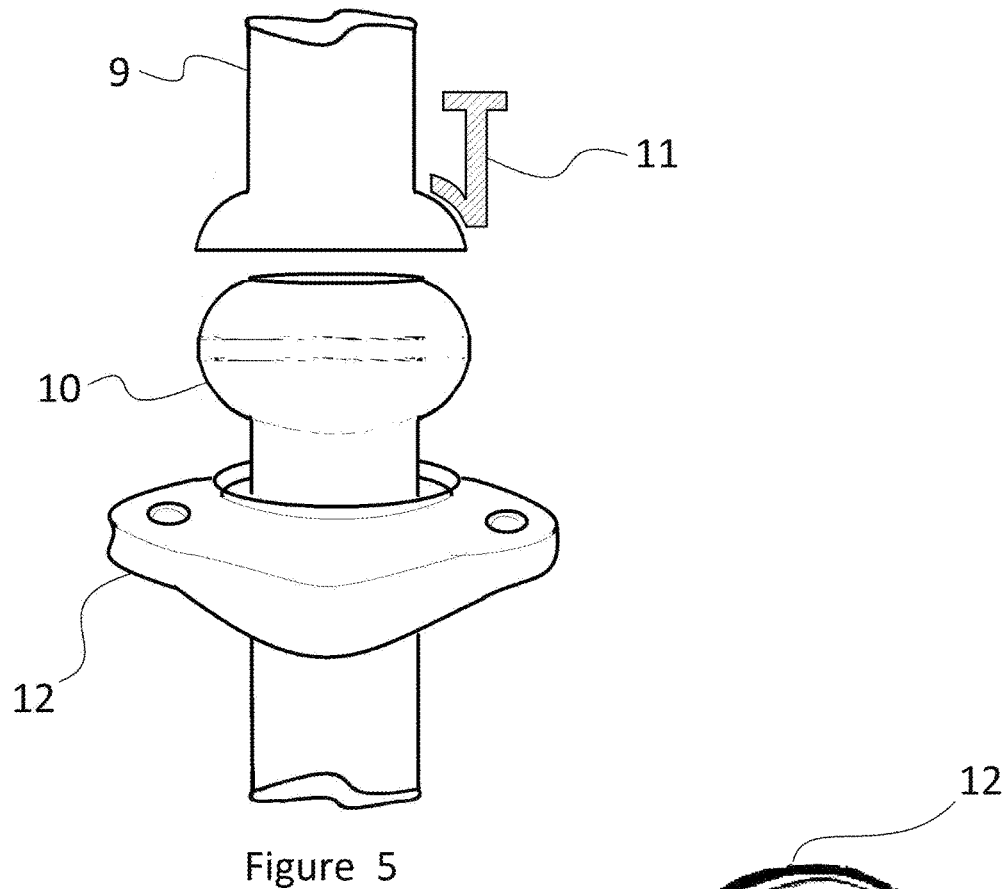
FIG. 5 is a two dimensional sliced cut-away view of a "J" shaped flange bracket and its placement relationship to a corresponding concave, or bunion shaped, flange pipe, convex flange pipe and its corresponding cupped one piece flange bracket.
Figure 6:
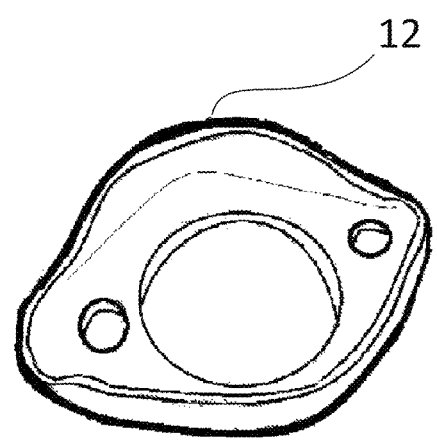
FIG. 6 is a opposite perspective of a cupped one piece flange bracket for FIG. 5.
Figure 7:
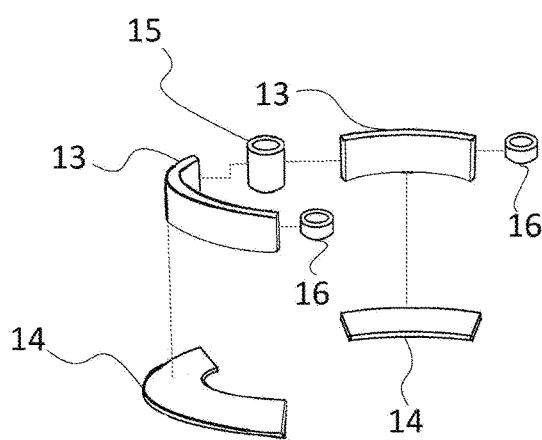
FIG. 7 is the exploded view of part 6 referred to in FIGS. 1-2 of the first of two piece assembly of a C Flange Bracket showing sections of side rail, commonly referred to as web in the engineering industry 13, top rail, commonly referred to as flange in the engineering industry 14, full size tube 15 and half sized tube 16.
Figure 8:
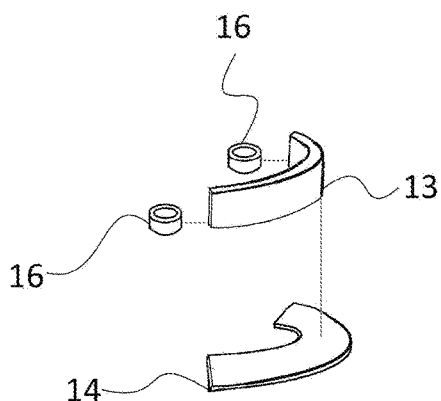
FIG. 8 is the exploded view of part 7 referred to in FIGS. 1-2 of the second, of two piece C Flange Bracket assembly showing the sections of side rail 13, top rail 14 and half sized tube 16.
Figure 9:
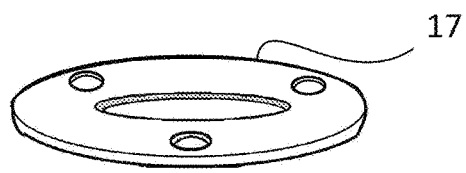
FIG. 9 is a perspective view of a separate flange piece unattached to or not affixed to a pipe 3.

In this aspect of the present invention, a two piece circular bracket assembly comprising of tubing holes with two holes of each piece overlapping, aligned together and allowing insertion of operable threaded bolts and in series into existing flange holes of joining piping systems and operable nuts fastening onto the bolts as a unit.

DETAILED DESCRIPTION OF THE INVENTION

The following detailed description is a contemplated mode of carrying out embodiments of the invention and is not to be taken in a limiting sense, but is made merely for the purpose of illustrating the general principles of the invention. The scope of the invention is best defined by the attached claims.

Broadly, a piping system under pressure of gas or liquid whose piping is adjoined to each other flanged ends, having damaged flanges or separated flanges, a system of repair that uses a two piece flange bracket assembly. The brackets are fastened over the existing separate holed flange 17 or flanges affixed to a pipe end, with tubed 15, 16 bolt holes aligned to allow threaded bolts 1 and nuts 2 to be screw-fastened to adjoining the pipe flanges 4. When installed tension is applied along the mating area 14 of the existing pipe flange to the adjoining flanges.

Referring to FIG. 1 though 2 a sectional piping system terminates at its flange 3 and continued in that system by adjoining to a holed flanged end pipe 4. The piping system flanges includes operable bolts 1 inserted into flange brackets tube and into holed flange pipe. Sandwiched between piping systems are gaskets 5 that are usually constructed of a softer material than is being used in the construction of a pipe.

Pipe flanges are either a flat single piece 17 unit separate from the pipe wherein a pipe is inserted into it, cupped single piece 12 or fastened as part of a pipe making it one unit which can be on both joined pipes or either of the adjourning ends of a pipe. When the surfaces of the flanges become weak or unable to maintain sufficient and even pressure on its mating surfaces a repair assembly using a C Flange Bracket 6, 7 can be added by the user to replace one or both separate piece flanges 17 then bolted with a replacement C Flange Bracket assembly then tightened with a nut 2 without the need by the user to cut the pipe to replace the flange bracket.

The C Flange Bracket assembly consist of at least two curved reinforced metal pieces holed at both ends 6, 7. Bolts 1 are used to fasten the curved metal pieces of the C Flange Bracket by way of the interlaced tubed ends and threaded using bolts by the user then threading that bolt through a gasket. To complete the assembly, the user then threads the bolt to the opposite adjourning flange followed by threading into an operable nut 2.

Figure 10:
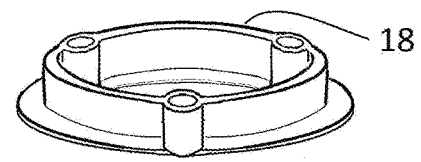
FIG. 10 is a perspective view of a one piece "T" formed flange.
Figure 11:
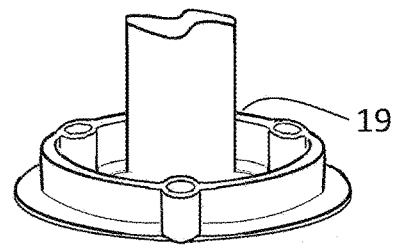
FIG. 11 is a perspective view of a one piece pipe with "T" formed flange.

It should be understood that the following describes variations not limited by the aforementioned use. Variations of this repair assembly falling under the embodiments of this invention:
- A. Piping applications requiring higher strength offered by a "T" beam formed bracket 7 at flange mating surfaces, in addition to using higher strength metals, an "I" beam formed bracket 8 can be used to create the C Flange Bracket.
- B. In applications where exisiting cupped two hole flange brackets 12 are used, the C Flange Bracket can be flipped allowing the "side rail" to be inserted into the existing cupped flange and joined by way of operable fitted threated bolts and tightened using nuts.
- C. A second bracket assembly 6, 7 can be added to support the opposite flange with longer bolts to reach through the first and second C Flange Brackets.
- D. In the application of a "J" styled formation C Flange Bracket assembly 11, wherein a bunion type flange 9, 10 exists on a pipe end. Between a set of washers, springs can be desposed between the bolt and flanges. This ensures equal presure on the flanges where movement deviates along the piping axis established during the initial installation of the flange bracket.
- E. One piece bracket construction of any of the aformentioned styled formations as similarly shown in FIGS. 10 through 11.

What is claimed is:

1. A flange bracket assembly comprising;
    at least two corresponding arc shaped bracket assembly parts connectable to define a collar, each part having
        a lower flange and a bisecting span extending therefrom defining a "T" shaped cross-section;
        a cylindrical tube affixed to each end of each bracket assembly part to support the span, each tube being half the vertical height of the part;
    wherein the cylindrical tubes of adjacent assembly parts are interlaced; and
    at least two fastening elements inserted through the cylindrical tubes to connect the bracket assembly parts and provide opposing forces against each part and to carry a load along the bracket assembly.

2. The flange bracket assembly of claim 1, wherein the corresponding bracket assembly parts are comprised of:
    (a) a first assembly part having an arc of 90 degrees or 180 degrees; and
    (b) a second separate assembly part having a complementary arc of 270 degrees or 180 degrees, respectively.

3. The flange bracket assembly of claim 1, wherein the bracket assembly parts are configured to provide equal pressure around a flange connection; (a) to brace a flair pipe; (b) to brace an existing flange on a pipe; (c) or affix onto a pipe.

4. The flange bracket assembly of claim 1, further comprising
    at least one full-sized cylindrical tube positioned along a length of an arc of at least one of said bracket assembly parts equidistant from each other and/ or the affixed half-height cylindrical tubes.

5. The flange bracket assembly of claim 1, wherein the bracket assembly parts are made from either:
    (a) rolled metal;
    (b) metal casting;
    (c) plastic;
    (d) carbon fibers; or
    (e) fiberglass.

6. The flange bracket assembly of claim 1, further comprising an upper flange attached to the bisecting span opposite the lower flange.

7. A method of supporting with equal pressure or repairing weakened or damaged pipe flanges:
    (a) removing or leaving in place an existing separate piece flange of a pipe;
    (b) interlacing, around a pipe whose flange has been removed or whose flange requires additional support, at least two corresponding arc shaped bracket assembly parts connectable to define a collar, each part having
        a lower flange and a bisecting span extending therefrom defining a "T" shaped cross-section;
        a cylindrical tube affixed to each end of each bracket assembly part to support the span, each tube being half the vertical height of the bracket assembly part;
    (c) inserting a fastening element through each set of adjacent corresponding cylindrical tubes of the bracket assembly parts, and into holes of a flange of an adjoining pipe; and securing the fastening thereto to secure contact of the lower flanges and the flange of the adjoining pipe.

8. The method of claim 7, wherein a gasket is sandwiched between the lower flanges and the flange of the adjoining pipe, with the fastening elements extending there through.

\* \* \* \* \*